US010769581B1

(12) United States Patent
Brazeau

(10) Patent No.: US 10,769,581 B1
(45) Date of Patent: Sep. 8, 2020

(54) OVERHANGING ITEM BACKGROUND SUBTRACTION

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 650 days.

(21) Appl. No.: 15/279,358

(22) Filed: Sep. 28, 2016

(51) Int. Cl.
*G06Q 10/08* (2012.01)

(52) U.S. Cl.
CPC .......... *G06Q 10/087* (2013.01); *G06Q 10/08* (2013.01)

(58) Field of Classification Search
CPC .................................................... G06Q 10/087
See application file for complete search history.

(56) References Cited

U.S. PATENT DOCUMENTS

| 8,280,547 | B2 | 10/2012 | D'Andrea et al. | |
| 9,087,314 | B2 | 7/2015 | Hoffman et al. | |
| 9,111,251 | B1* | 8/2015 | Brazeau | G06Q 10/087 |
| 10,198,710 | B1* | 2/2019 | Hahn | G06Q 10/087 |
| 2003/0052778 | A1* | 3/2003 | Wong | G06Q 10/087 340/540 |
| 2010/0019906 | A1* | 1/2010 | Kushida | B65G 1/137 340/572.1 |
| 2013/0302132 | A1* | 11/2013 | D'Andrea | G06Q 10/08 414/807 |
| 2014/0110584 | A1* | 4/2014 | Campbell | G06Q 30/0261 250/340 |
| 2016/0110703 | A1* | 4/2016 | Herring | G01G 19/4144 705/23 |
| 2016/0304281 | A1* | 10/2016 | Elazary | B25J 19/023 |
| 2018/0029797 | A1* | 2/2018 | Hance | B65G 1/1373 |
| 2018/0079081 | A1* | 3/2018 | Chen | B25J 9/0003 |

\* cited by examiner

*Primary Examiner* — Florian M Zeender
*Assistant Examiner* — Whitney Poffenbarger
(74) *Attorney, Agent, or Firm* — Kilpatrick Townsend & Stockton LLP

(57) ABSTRACT

Embodiments are directed to an inventory system that comprises sensors and a management module to automatically determine an inventory item and its location without requiring hand-scanners. The system may determine that the object being handled is an inventory item at the location of the obstruction based at least on the inventory holder information and the location of the obstruction, and update a relative location of the inventory item based at least in part on the handling of the inventory item.

13 Claims, 13 Drawing Sheets

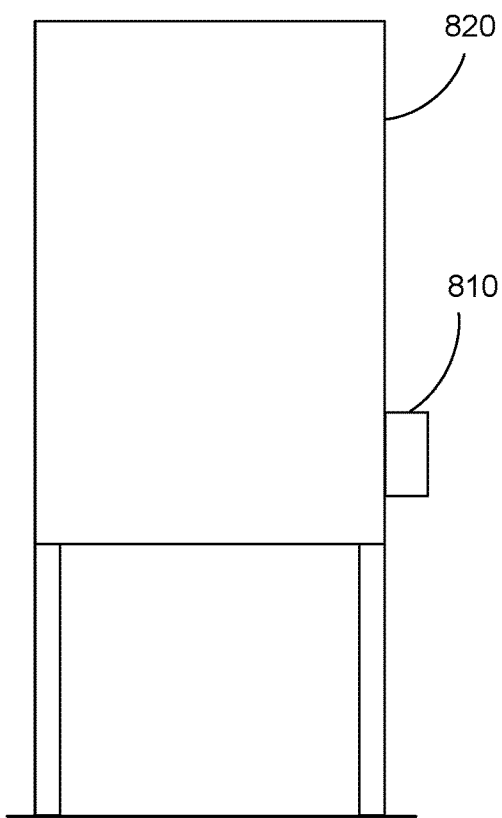
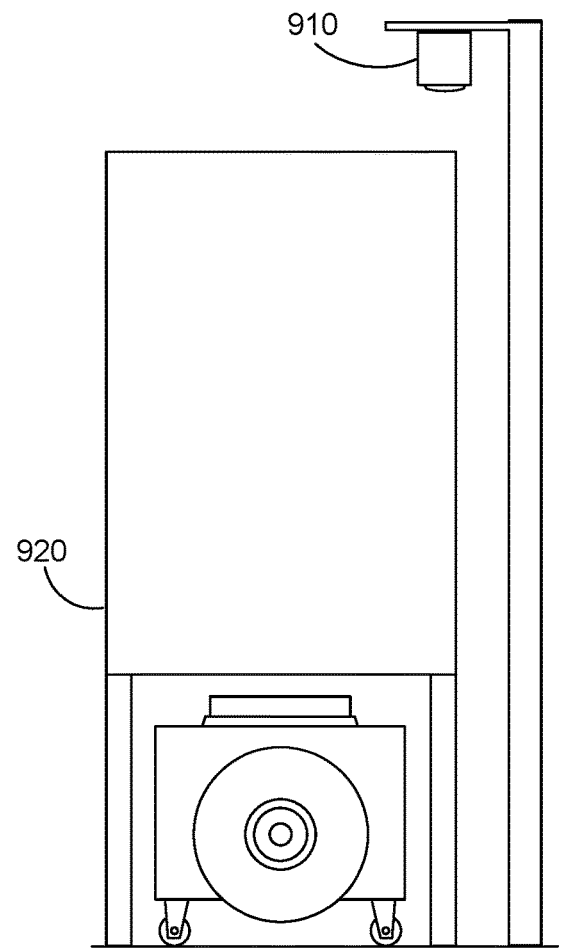
FIG. 8
FIG. 9

OVERHANGING ITEM BACKGROUND SUBTRACTION

BACKGROUND

Modern inventory systems face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space equipment, may result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

In an example, an inventory system includes storage spaces for stowing or picking items. The distribution of the items in the storage are tracked to enable different inventory-related actions. Over time, incorrect or inaccurate tracking of the items may result in failures or incorrect performances of the inventory-related actions, thereby reducing the inventory system efficiency and throughput.

BRIEF DESCRIPTION OF THE DRAWINGS

Various embodiments in accordance with the present disclosure will be described with reference to the drawings, in which:

FIGS. 8-9 illustrate a sensor, mobile drive unit, and inventory holder according to a particular embodiment;

DETAILED DESCRIPTION

Figure 1:
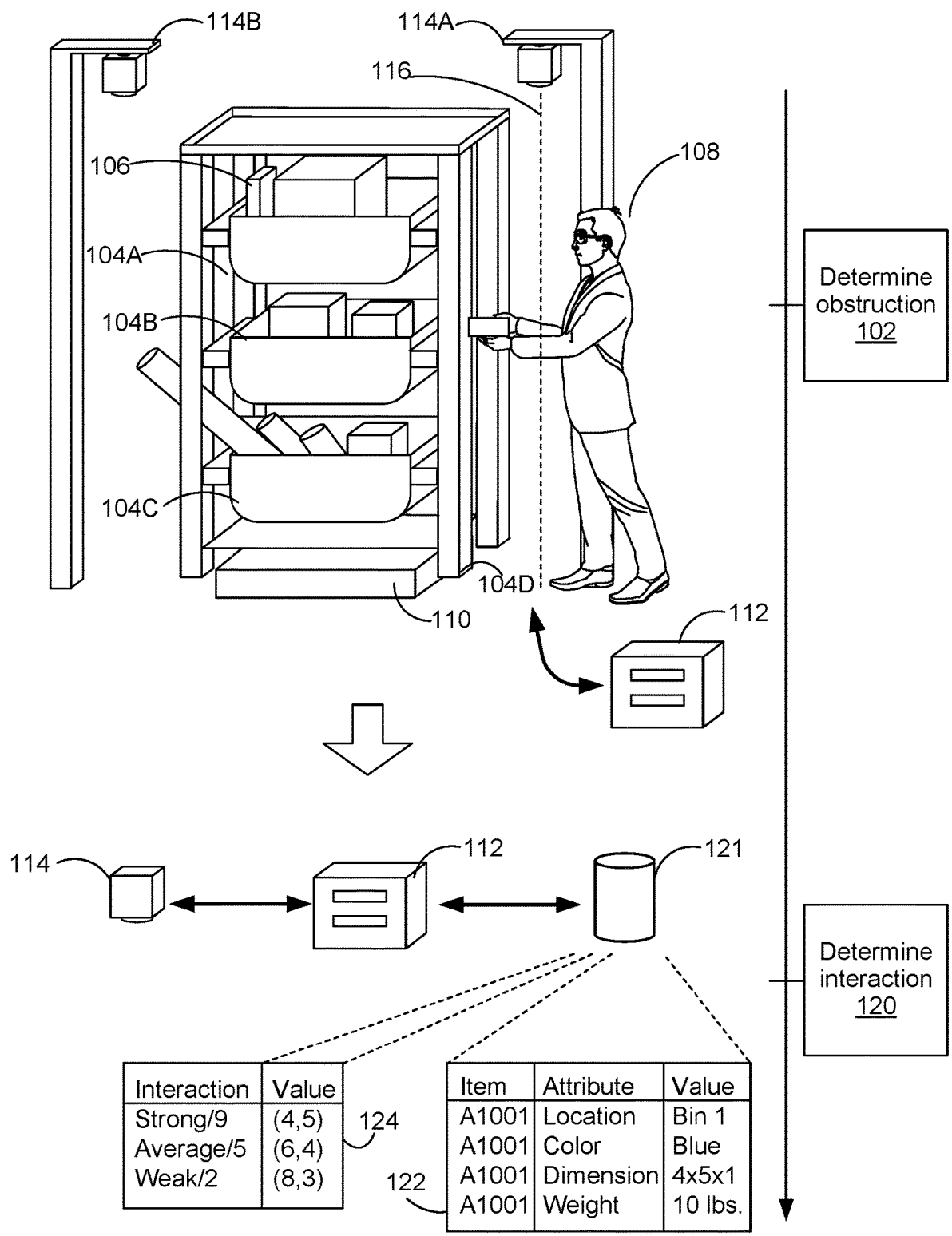
FIG. 1 illustrates determining inventory holder information according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory management system having multiple inventory holders and drive units for moving the inventory holders. Specifically, features herein are directed to automatically determining that an object has moved in or around the inventory holder and updating the inventory holder information based at least in part on this determination. For example, the inventory management system (or "inventory system," used interchangeably) may comprise sensors and a management module in addition to the multiple inventory holders and drive units. The sensors may be located at a distance from the inventory holders where the inventory holders are stationed while the users perform a task. The inventory management system may access inventory holder information that describes an attribute of the inventory holder, including inventory bins stored in the inventory holder, inventory items contained in the inventory holder or inventory bins, colors, shapes, sizes of the inventory items in the inventory holder, movement (translational or rotational) of the inventory holder by a mobile drive unit, and the like. The inventory management system may determine that an object has moved between the inventory holder and the sensor, thereby obstructing the sensor's view of the inventory holder. The inventory management system may determine a location of the obstruction based at least in part on data generated by the sensor and determine that an object being handled at that location may be a particular inventory item (e.g., an inventory item already stored at that location and having shape, color, or size such that the inventory item is likely the object being handled, etc.). The inventory management system may update the attribute of the inventory holder and a relative location of the inventory item in the inventory holder.

As a sample illustration, the inventory management system accesses information about the items and inventory bins that are stored with the inventory holder. The information may identify that one round, red ball is in a first inventory bin closest to a sensor and a square, blue box is in the second inventory bin farther away from the sensor. The sensor measures color and size data that identifies that an object has entered a location next to one of the inventory bins. The inventory management system may determine that the object is a user's arm that is handling one of the items (e.g., based on the relative size and movement of the object, based on the dimensions of the object not matching the round, red ball or the square, blue box in the inventory holders, based on comparing known dimensions of arms with the received dimensions from the sensor, etc.). Based at least in part on the location of the arm and/or the item identified by the sensor, the inventory system may determine that the user is taking the red ball from its location in the inventory bin. The inventory system may then update the location of the red ball to a second, sensed location in a second inventory holder.

In another illustration, the inventory management system may alternatively determine that the object is an inventory item overhanging from the inventory holder. For example, the sensed data may identify at least a portion of the shape, color, or size of the inventory item and match that data with the inventory information for the particular location in the inventory holder. The sensed data may also identify that the inventory item does not move for a duration of time, or the sensed data identifies that the inventory item is in the same location at multiple inventory stations in a fulfillment center. Based at least in part on the identification of an overhanging item, the inventory holder may be directed to a cleanup location (e.g., to restock the overhanging item, etc.) or provide feedback to instruct a user to fix the overhanging item to avoid blocking the sensor. The inventory management system may ignore the overhanging item until the item may be placed back into the inventory holder, preventing further obstructions to the sensor associated with the inventory holder.

This process may be an improvement on standard scanning processes in inventory management. For example, a typical interaction between a user, inventory item, and an inventory holder may comprise a user with a hand scanner. The user may use the hand scanner to scan the inventory item that they removed from an inventory holder, scan the first inventory holder to identify the origin of the item with the system, and scan a second inventory holder to identify to the system where they intend to place the inventory item. Traditionally, this multi-scanning process would help track the location of the items between receiving the inventory item from the provider in a shipping crate, to stowing the item in a fulfillment center, to packing and shipping the item to a consumer after the item is ordered by that consumer. Each step of the traditional process may involve scanning with the hand scanner. The improved scanning process may be implemented to remove the scanner from the user's hands and maintain a sensor that is not handled by the user. This improvement may help to, at least in part, free the user's hands for other tasks. The sensor may help detect which inventory item is stowed or picked, where the inventory item is placed or moved between inventory holders, and/or whether inventory items are overhanging or otherwise misplaced. The improvements increase the throughput of the inventory management system because users may be able to more efficiently, quickly, and securely move items in and out of inventory holders.

FIG. 1 illustrates a process of detecting updated inventory holder information of inventory items according to a particular embodiment. In a non-limiting example, the method 100 may determine an obstruction of an object by a sensor at 102. For example, the inventory holder 104 (illustrated as 104A, 104B, 104C, 104D) may be configured to store inventory items 106 that are accessed by a user 108. A mobile drive unit 110 may be configured to move the inventory holder 104 to a location that is accessible by the user 108. Additional details about inventory holder 104, mobile drive unit 110, and system that manages these and other devices is provided at least with FIGS. 2-7.

A user may interact with an inventory item. For example, the user 108 may reach into an inventory holder 104 to access an inventory item 106. By reaching into the inventory holder 104, the user 108 may pass through a light curtain 116 generated by the sensor 114 to access the inventory item. The light curtain 116 may comprise an invisible, vertical line between the sensor and the floor. Although a light curtain 116 is provided as one example associated with a particular type of sensor (e.g., a light sensor, etc.), other sensing fields are possible. Particularly, the sensor implemented in particular embodiments of the application would have a field of view and may help measure, sense, or otherwise identify any object that passes through this field of view. Changes in the field of view may be sensed by the sensor and output to the system for analysis (e.g., using a processor, management module, etc.). The sensor may provide various types of output (e.g., using electrical or optical signals, etc.) to the system, which may generate data about objects that come within a proximate distance of the inventory holder.

The inventory items may be contained within the inventory holders. For example, during a "stowing" process, a user may receive an inventory item from an item provider, conveyor belt, a second inventory holder, or other source and place the item into an inventory bin inside of an inventory holder. The user may place the inventory item in a location in the inventory holder that encompasses the entire inventory item so that no part of the inventory item hangs over the side of the inventory bin or inventory holder. The inventory bins may be different sizes to accommodate different sized items. Additional details associated with generating data by the system using the sensor(s) are provided at least with FIGS. 8-11.

The sensor 114 may generate data points for each an object it detects between the inventory holder 104 and the sensor 114, and may send this data to the management module 112 associated with the inventory management system. The management module 112 may analyze the data points to determine the object. In some examples, the object may correspond with the inventory item at a particular location. The object may also correspond with an appendage of the user accessing the inventory item.

The determination of whether the inventory item is properly stowed or overhanging may be based in part on a sensor and a vertical light curtain between the sensor and the floor. When an object breaks the light curtain provided by the sensor, the sensor may determine attributes about the object at the points where the object is interacting with the light curtain. The attributes may include an object's dimensions, shape, color, length of time interacting with the light curtain, and the like.

Alternatively, in some examples, the object determined by the management module 112 may correspond with an inventory item erroneously overhanging outside of the inventory bin and obstructing the light curtain generated by the sensor. The inventory item may be placed in an inventory holder and not fit or become an overhanging item. For example, the item may be overhanging when a portion of the item remains outside of an inventory bin, after an interaction between the user and the inventory bin or inventory holder stops.

The attributes about the object may be received by bouncing light off of the object and the reflection of the light may be analyzed by the sensor. The analyzed information may be transmitted to the system. The system may generate combined information about the object by piecing together the individual attributes. Other object analysis methods may be used as well, as described at least with FIGS. 8-9.

In some examples, the system may access a data store 121 with inventory holder information 122 associated with the inventory holder. The inventory holder information may comprise information about the inventory items that are stored with the inventory holders. For example, once an inventory item is identified as breaking the light curtain at a particular location adjacent to an inventory bin of an inventory holder, the inventory holder information may be updated to identify that the inventory item was placed into that inventory bin.

The inventory holder information may comprise at least an attribute of the inventory holder. The attribute may comprise the number of inventory items contained in the inventory bin. In some examples, the attribute may comprise dimensions of the inventory bins contained within the inventory holder or other specifications of the inventory holder that may help identify where the inventory item may be located when it is stored with the inventory holder. The dimensions may include, for example, height, width, length, depth, and the like, so that when the height of the inventory bin is compared with the height of the inventory item, a determination may be made as to whether the inventory item may fit in the inventory bin.

The management module 112 may determine the location of the obstruction by the object. The location may be determined based at least in part on the sensed data. For example, the distance between the sensor and the obstruction is the similar distance between the sensor and the stored location of the red ball identified in the inventory holder information. The inventory system may determine that the location of the obstruction likely corresponds with the location of the particular inventory item.

The interaction may be determined at 120. For example, based at least in part on the inventory holder information 122 and the location of the obstruction, the management module 112 may determine that the object is associated with handling the particular inventory item at the location of the obstruction.

The system may access a data store 121 with interaction data 124. The interaction data 124 may be measured as a strong or weak interaction based at least in part on the number of data points sensed or measured by the sensor. For example, the sensor 114 may identify a greater number of data points when the object has a greater circumference or other dimensions than an object with a smaller circumference or dimensions. The data points may be identified by the number of intersection points between an object and a light curtain associated with the sensor. The number of data points may be measured at one or more points of time as well, such that a longer interaction with the light curtain may produce more data.

In a sample illustration, a user's hand and knee may be interacting with the light curtain between the sensor and a raised ground that is located underneath an inventory holder. The interactions with the light curtain occur when the user places an object into the inventory holder located in front of them (e.g., the interaction with the hand) and the user braces themselves against the inventory holder for balance (e.g., the interaction with the knee). The strength of the interactions may be stored with the system. For example, if the knee is stronger than the hand, more data points may be received by the sensor relative to a single location. Similarly, a roll of paper towels may be sticking out of the inventory holder, which may also cause a strong interaction with the light curtain between the sensor and the raised ground.

The system may store some of these interactions as a background of an interaction map, despite the strength of the interaction. As described in the previous illustration, the roll of paper towels may continue to stick out of the inventory holder and, to prevent this object from being stored by the system may be ignored. When the next interaction with the inventory holder occurs, the roll of paper towels (e.g., at the particular location identified by the sensor) may be ignored as background, so that other interactions with the sensor may help identify new objects being placed into the inventory holder at different locations.

In some examples, the system may provide feedback regarding the background object. For example, the system could flash a light at the overhanging object, highlight the object in a different color, or update a user interface to instruct the user to move the object into the inventory bin or another location in the inventory holder.

The sensed data may be analyzed and compared with the inventory holder information. For example, the system may determine a shape, color, or size of the object and store the shape, color, or size with the data store associated with the inventory management system. In some examples, the sensed data may identify an inventory item and attributes associated with the inventory item which may be stored as inventory item data.

A location of the inventory item may be updated. The location may comprise a particular inventory holder, inventory bin, or other relevant information related to the location of the inventory item.

Figure 2:
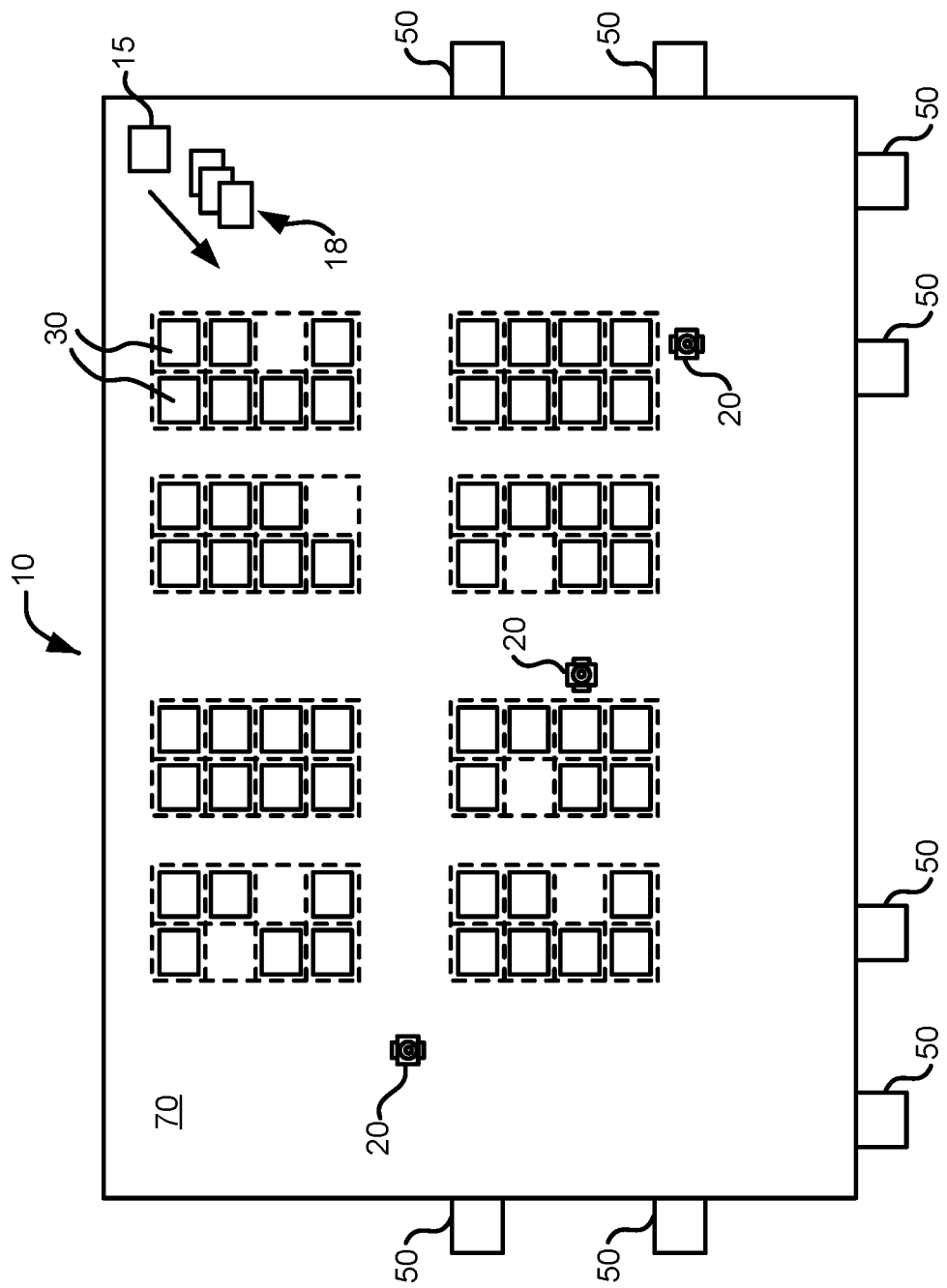
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items may be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 may move and/or inventory holders 30 may be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and may move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space and equipment, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 may generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
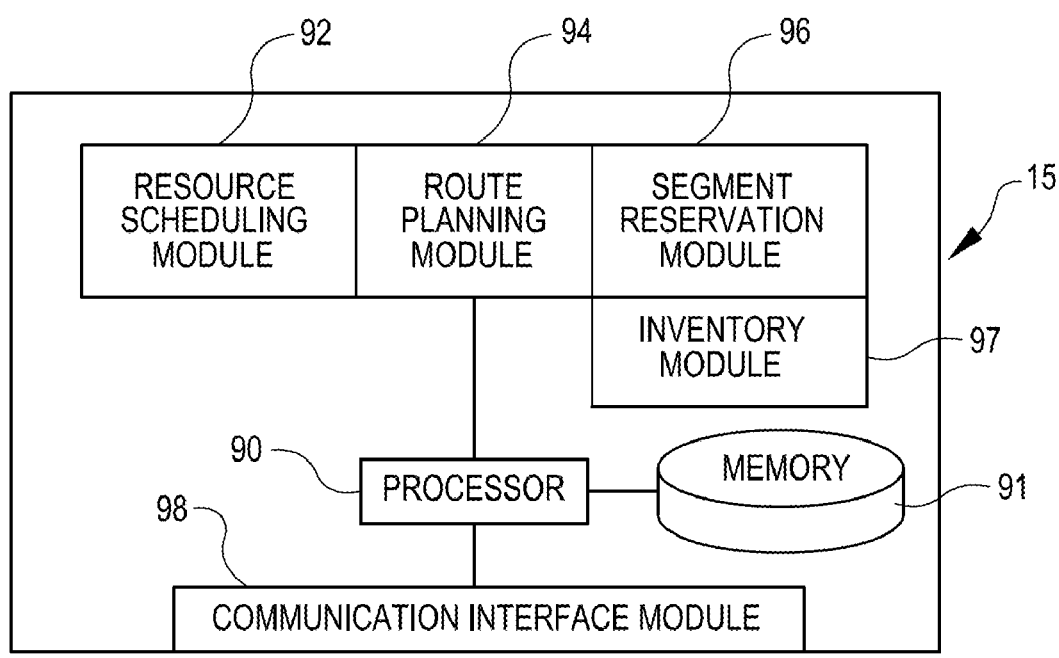
FIG. 3 illustrates in greater detail the components of an example management module that may be utilized in particular embodiments of the inventory system.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information may be maintained about the number of inventory items 40 in a particular inventory holder 30, and the maintained information may include the location of those inventory items 40 in the inventory holder 30. The inventory module 97 may also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
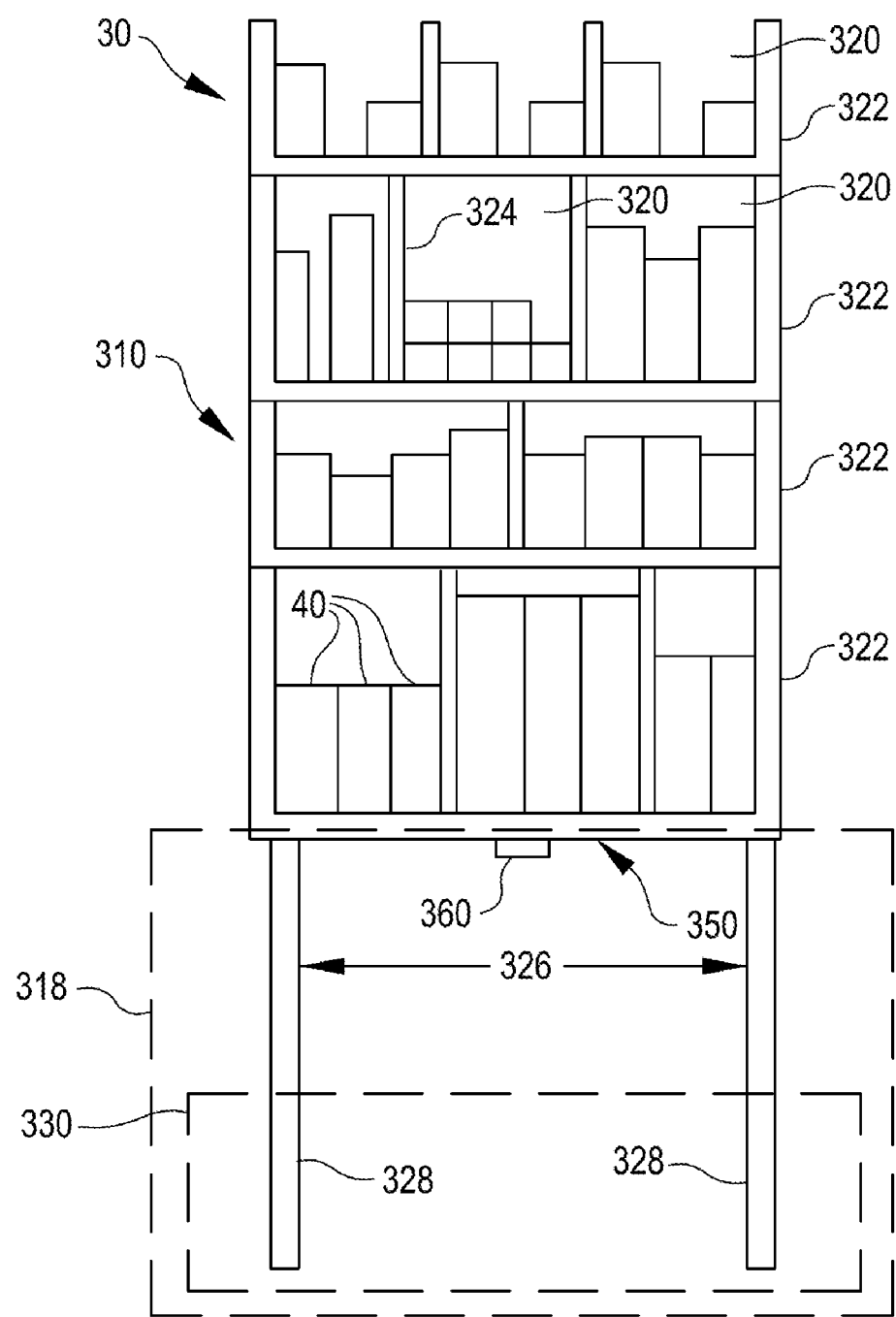
FIG. 4 illustrates an example inventory holder that may be utilized in particular embodiments of the inventory system.

FIG. 4 illustrates an example inventory holder that may be utilized in particular embodiments of the inventory system. The structure and contents of one side of an example inventory holder 30 is illustrated and may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that may detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 may optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a user (e.g., packer) selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after the user has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 5:
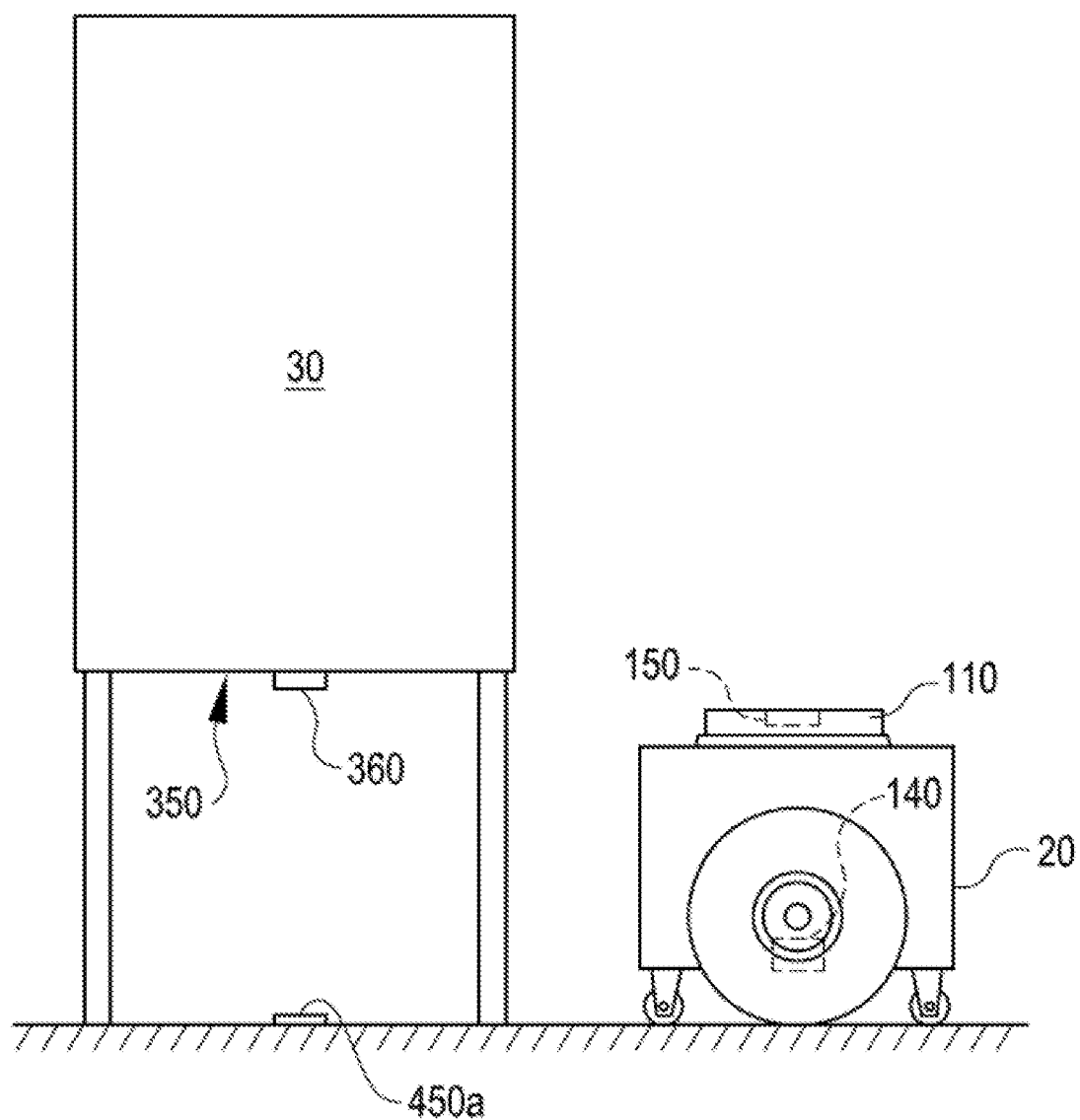
FIGS. 5-7 show operations of the mobile drive unit and the inventory holder according to a particular embodiment.

FIG. 5 shows an operation of the mobile drive unit and the inventory holder according to a particular embodiment. For example, mobile drive unit 20 and inventory holder 30 may be essentially separate prior to docking. The mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 5 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, may be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video processing components, to detect fiducial marks 450.

Figure 6:
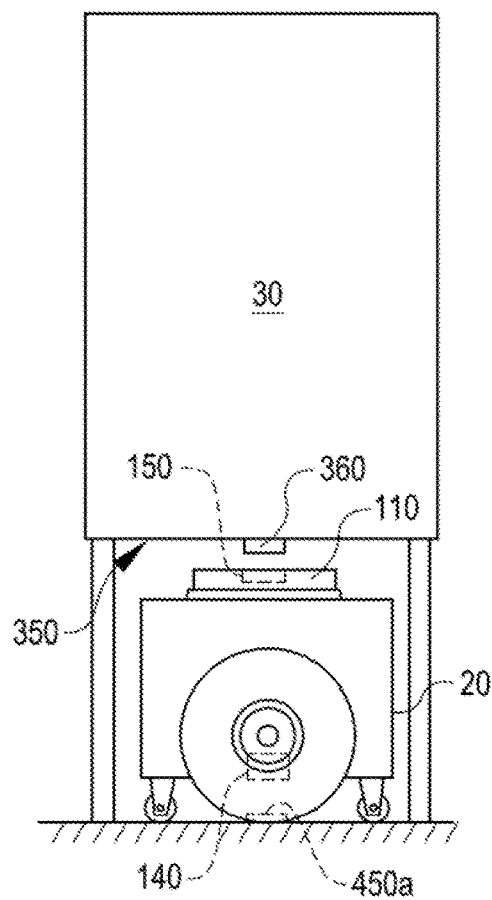

FIG. 6 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

Figure 7:
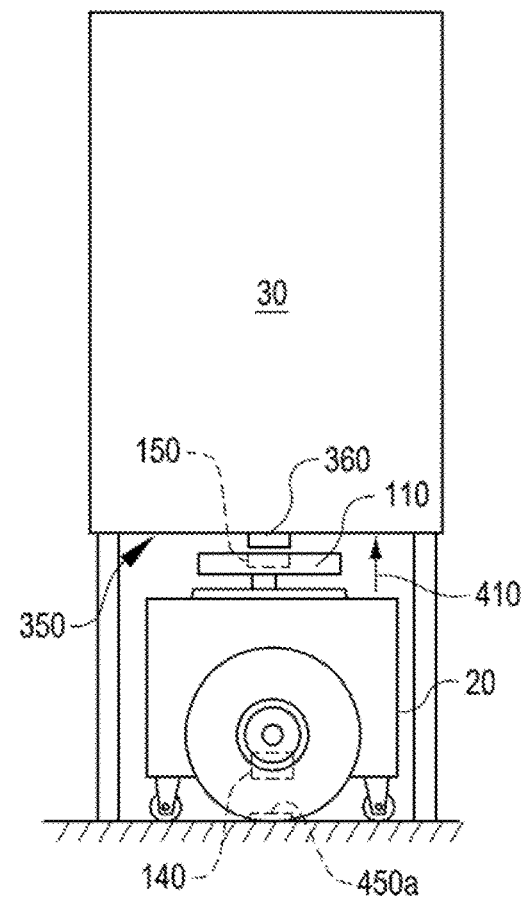

FIG. 7 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Mobile drive unit 20 is capable of inducing translational and/or rotational movement in inventory holder 30 while mobile drive unit 20 is docked with inventory holder 30, as well as undocking from inventory holder 30 (not shown). For example, mobile drive unit 20 determines its location based on fiducial mark 450B and, as a result, determines that it has reached the undocking location. After determining that it has reached the undocking location, mobile drive unit 20 initiates an appropriate undocking process based on the configuration and characteristics of mobile drive unit 20 and inventory holder 30. Mobile drive unit 20 may then move away from inventory holder 30 and begin responding to other commands received by mobile drive unit 20.

The translational and/or rotational movement can cause movement in items within the inventory holder 30 as well. For example, the inventory holder 30 may be raised 6-inches by the mobile drive unit 20, causing the inventory items within the inventory holder to raise 6-inches as well. This movement may cause the inventory items to become dislodged from the inventory holder and, potentially, overhang from the inventory holder 30. When a sensor is implemented adjacent to or around the inventory holder, the overhanging inventory item(s) may obstruct a light curtain emitted from the sensor, based at least in part on the movement of the inventory holder 30 associated with the mobile drive unit 20 (e.g., docking/undocking, movement around workspace 70, etc.).

FIGS. 8-9 illustrate a sensor, mobile drive unit, and inventory holder according to a particular embodiment. The sensor 810 may be coupled with the inventory holder 820, as illustrated in FIG. 8, or the sensor 910 may be positioned away from the inventory holder 920 (e.g., on a station, associated with a fiducial mark, etc.), as illustrated in FIG. 9. The sensor may sense or measure data within a distance between the sensor and the inventory holder to help identify any obstructions around the sensor. The obstructions may identify the item, user placing (e.g., stowing) or taking (e.g., picking) the inventory item from the inventory holder, or an overhanging inventory item that may be fixed.

The sensor may comprise various types of sensors known by a person of reasonable skill in the art. For example, the sensor may be a LiDAR sensor that may measure the distance and angle between the sensor and the obstruction with a laser light. The information received from the LiDAR sensor may be stored as inventory information, attributes, location information, and the like.

The sensor may comprise a depth camera and/or red/green/blue (RGB) sensor to identify distance and color, respectively. For example, the depth camera sensor may calculate the distance between the sensor and the obstruction. The RGB sensor may calculate a color value of the obstruction. In some examples, the sensors may be used concurrently to collect multiple types of information, including distance and attribute measurements of the obstruction. This may help identify the type of object causing the obstruction and the location where the obstruction is occurring.

The sensor may comprise a motion capture system. For example, the motion capture system may sample the movements of the obstruction many times per second to help identify the movement of the object around the inventory holder. The motion capture may help identify the inventory bin that the inventory item is placed, in part by identifying a movement toward an inventory bin with an inventory item, a pause, and a movement away from an inventory bin without the inventory item. The location of the pause may be used to identify the location that the inventory item was placed.

The sensor may comprise an accelerometer (e.g., placed on a user and/or inventory item, etc.). For example, the accelerometer may identify that the user is moving toward the inventory holder and moving away from an inventory holder. A second sensor may identify the item (e.g., LiDAR to detect dimensions, etc.). The movement toward an inventory bin, a pause, and a movement away from an inventory bin may help identify that the user accessed the inventory bin and/or inventory holder. The combination of the sensor with the accelerometer data may help identify the item that was placed in the particular location.

As described above, embodiments herein are directed to determining that an object has moved in or around the inventory holder or drive unit and updating the inventory holder information. In accordance with some embodiments, the mobile drive units are utilized to perform the function of moving the inventory holders that may cause objects to obstruct or provide other indications to sensors and causing the movement of inventory items within the initial inventory holder or between the adjacent inventory holders.

Figure 10:
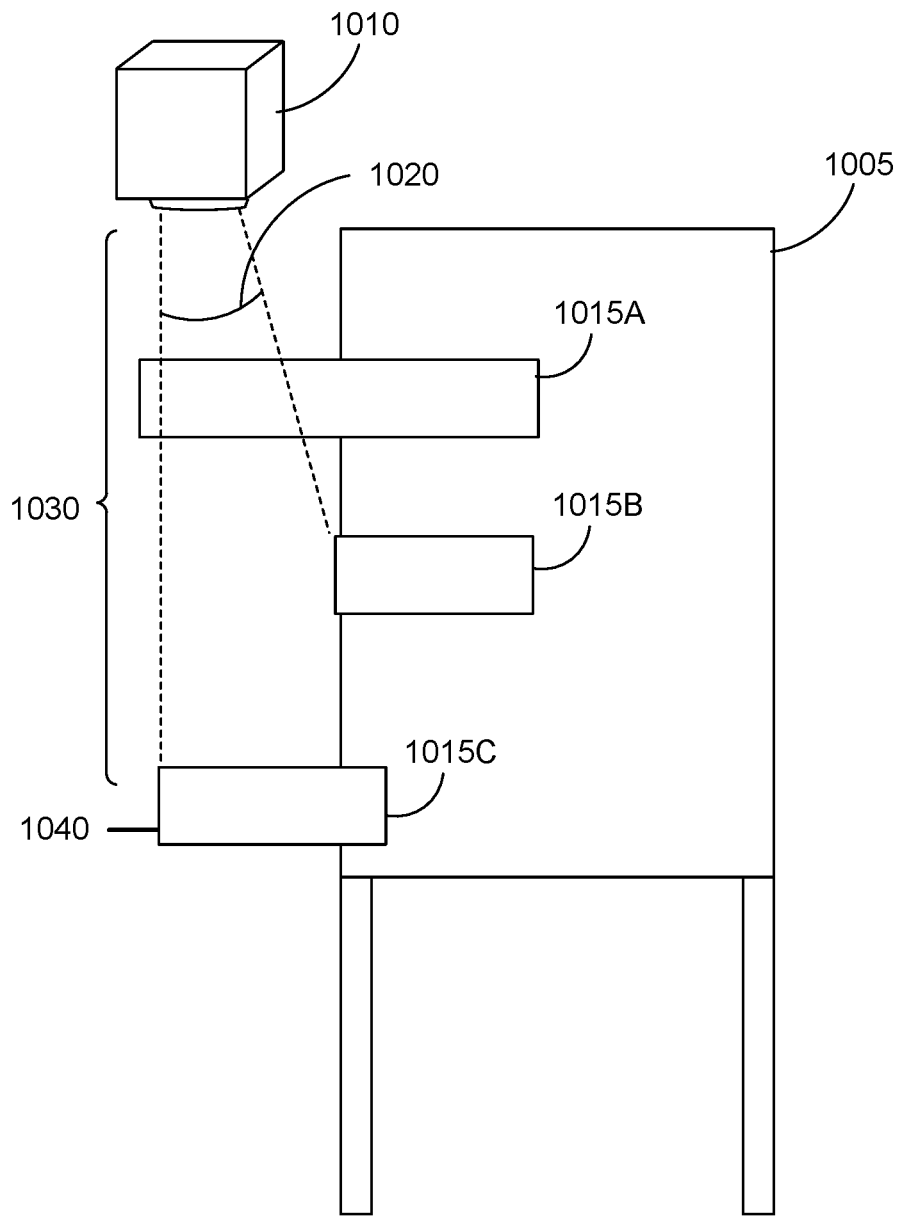
FIG. 10 shows measurements between the sensor and the inventory holder according to a particular embodiment.

FIG. 10 illustrates the movement and measurement of some objects associated with an inventory holder. For example, FIG. 10 shows measurements between the sensor 1010 and the inventory holder 1005 and/or inventory bins 1015 (illustrated as 1015A, 1015B, 1015C) according to a particular embodiment. The sensor may sense or measure data points that are transmitted to the system. The system (e.g., using the processor, management module, etc.) can analyze and measure the data points to determine the angle 1020 of the inventory item, distance 1030 between the sensor and the inventory item, or absolute value or the x, y coordinate location 1040 of the inventory item relative to the sensor, ground, inventory holder, or base. Any of these or other measurements may determine inventory holder information and/or update the location information of inventory items contained by the inventory holder.

The sensor may be used to identify one or more inventory bins associated with the inventory holder. For example, the sensor may identify multiple inventory bins. For example, the sensor may identify a first inventory bin and a second inventory bin associated with the inventory holder. The inventory bins may also be identified based at least in part on the inventory holder information.

The system may compare inventory bins based at least in part on the sensor data. For example, the inventory management system may access, from the data store associated with the inventory management system, item information describing a size of the inventory item. The system may determine a first size of the first inventory bin and a second size of the second inventory bin based at least in part on the inventory holder information. The system may determine that the first size of the first inventory bin is too small to fit the inventory item based on a comparison of the first size of the first inventory bin and the size of the item. when the second size of the second inventory bin is larger than the size of the item, the system may determine that the handling of the inventory item comprises storing the inventory item in the second inventory bin.

In another example, the system may determine a first number of items in the first inventory bin and determine a second number of items in the second inventory bin. The number of items may be determined by sensor data, including calculating the number of items that obstruct the sensor reaching a particular location that corresponds to the particular inventory bin. In some examples, the number of items may be determined by inventory holder data (e.g. the number of items added minus the number of items removed) rather than sensor data.

The number of items may be compared with an item threshold. For example, an inventory bin in a particular inventory holder may hold a maximum number of ten items (or some other number). When the first number of items in the first inventory bin is at the item threshold (e.g., the inventory bin contains ten items) and the second number of items in the second inventory bin is less than the threshold (e.g., the inventory bin contains three items), the system may determine that the handling of the inventory item comprises storing the inventory item in the second inventory bin.

In some examples, the sensor may generate an interaction map that corresponds with foreground and background objects. The foreground objects may be identified by the sensor as objects that are not static over a duration of time. These may include an inventory item newly placed or removed in an inventory bin (e.g., stowing or picking the inventory item, respectively) or an arm of a user placing or removing the inventory item from the inventory bin. The background objects may be identified by the sensor as objects that are static over a duration of time but continue to interact with the light curtain or other obstruction line associated with the sensor.

The interaction map may be used to identify new interactions with the inventory holder from the foreground objects and ignore erroneous interactions with the inventory holder from the background objects. The interaction map may be included with the inventory holder information that describes at least an attribute of the inventory holder (e.g., foreground and background objects may also be attributes, etc.).

Figure 11:
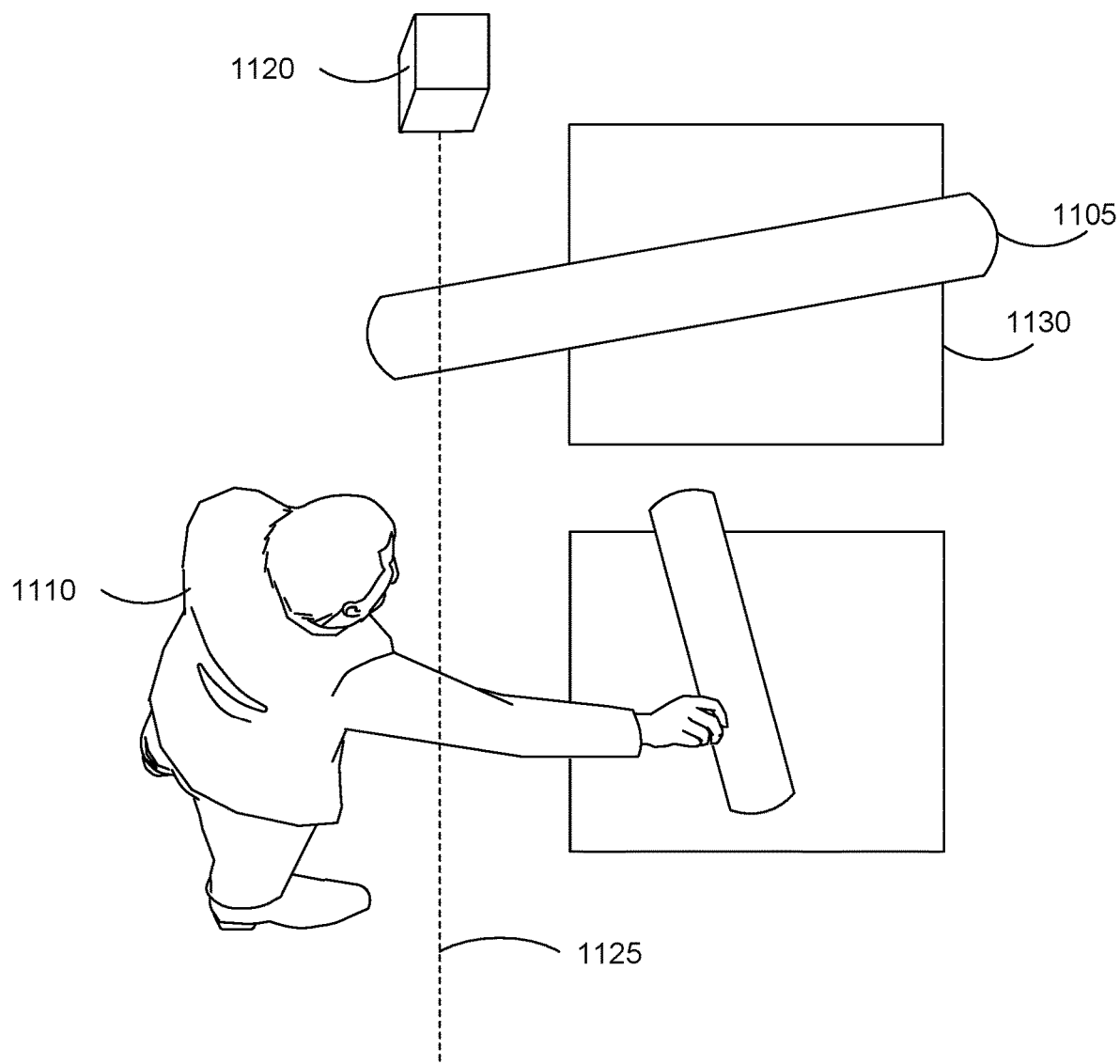
FIG. 11 shows an overhead view of a user and an inventory holder according to a particular embodiment.

FIG. 11 shows an overhead view of the map with foreground and background objects, including an inventory item, a user, and an inventory holder according to a particular embodiment. As illustrated, a user 1110 and an inventory item 1105 are interacting with a light curtain 1125 associated with sensor 1120. The foreground may include the user's arm or knee (e.g., human appendages, etc.) and the background may include the inventory item 1105, especially if the inventory item obstructs the light curtain over time without being fully contained within the inventory bin 1130. In some examples, as illustrated with FIG. 7, the obstruction may be caused at least in part by the translational and/or rotational movement of the inventory holder 30, by interactions with the mobile drive unit 20, and the like.

In some examples, the user 1110 and the inventory item 1105 may appear similar, where the width of an appendage of the user 1110 may appear similar to the width of the inventory item 1105. As such, the system may distinguish between the user 1110 and the inventory item 1105 based on other attributes, including a movement over time. For example, the appendage of the user 1110 may move while the inventory holder is located at a station while the inventory item 1105 may remain static. In some examples, the mobile drive unit may raise or lower the inventory item 1105 as the inventory item is located in the inventory holder. The system can distinguish between the inventory item 1105 and the appendage of the user 1110 when the movement of the item corresponds with the movement of the inventory holder (e.g., velocity, height, etc.).

In some examples, the system may distinguish between the appendage of the user 1110 and the inventory item 1105 at least in part because the appendage of the user 1110 may be moving while the inventory item 1105 may be static. In some examples, the system may distinguish between the appendage of the user 1110 and the inventory item 1105 at least in part because the inventory item 1105 moves in relation to the movement of the inventory holder by the mobile drive unit and the appendage of the user 1110 does not (e.g., waits for the movement to stop, etc.).

The foreground objects may include a human appendage that interacts with the sensor during picking or stowing an item. Determining that an item is picked may comprise determining that the object has moved out of the inventory holder, based at least in part on second sensed data. When the object moves out of the inventory holder, the system may determine that the inventory item is picked from the inventory holder at a particular location associated with the second sensed data. The inventory item may be identified as well, based on the second sensed data (e.g., dimensions, color, etc.). The system may determine that the object is a particular inventory item, based at least in part on the second sensed data and update the relative location of the particular inventory item out of the inventory holder.

The handling may involve stowing the item. Determining that an item is stowed may comprise determining that the object has moved into the inventory holder, based at least in part on second sensed data. When the object moves into the inventory holder, the system may determine that the inventory item is stowed in the inventory holder at a particular location associated with the second sensed data. The inventory item may be identified as well, based on the second sensed data (e.g., dimensions, color, etc.). The system may determine that the object is a particular inventory item, based at least in part on the second sensed data and update the relative location of the particular inventory item into the inventory holder.

The system may determine that the item is overhanging various ways. For example, the inventory management system may determine that the object moved between the inventory holder and the sensor before an interaction with the inventory item at a particular station. The movement may be identified in first sensed data at a first time and second sensed data at a second time. For example, the first sensed data may be determined by a first sensor at a first station and the inventory holder may move to a second station (e.g., by a mobile unit described in at least FIG. 2). A second sensor (e.g., in the same inventory management system) may also detect the inventory item in the same obstructive location in the second sensed data. In some examples, this inventory item may be identified as an overhanging object or may be identified as a background object in an interaction map, based at least in part on the second sensed data (e.g., as illustrated in FIG. 11).

In another example, the system may determine that the item is overhanging by determining that the inventory holder is clear of objects between the inventory holder and the sensor at a first time and determining that the sensor detects the obstruction at a second time and at a third time. Based at least in part on detecting the obstruction at the second time and the third time, but not the first time, the system may determine that the object is an overhanging item.

In another example, the system may determine that the item is overhanging by determining that the inventory holder is initially clear of objects between the inventory holder and the sensor and determining, based at least in part on the sensed data, that the object moved to an adjacent location where the inventory item is stored. The system may then determine that the object is a human appendage based at least in part on the inventory holder being initially clear and based at least in part on the object moving to the adjacent location.

In another example, the system may access item information associated with the inventory item from the data store. The system may determine second sensed data about the object (e.g., using one or more data points, using data points gather over time, determining a color or identifier of an inventory item, etc.). The system may match the second sensed data with the item information and determine that the object is an overhanging item based at least in part on the matching.

Once the inventory item is determined to be overhanging, the system may instruct the mobile drive unit to move the inventory holder to a different location based at least in part on the determination that the inventory item is overhanging. The different location may, for example, include a station with another user to adjust the inventory item.

Figure 12:
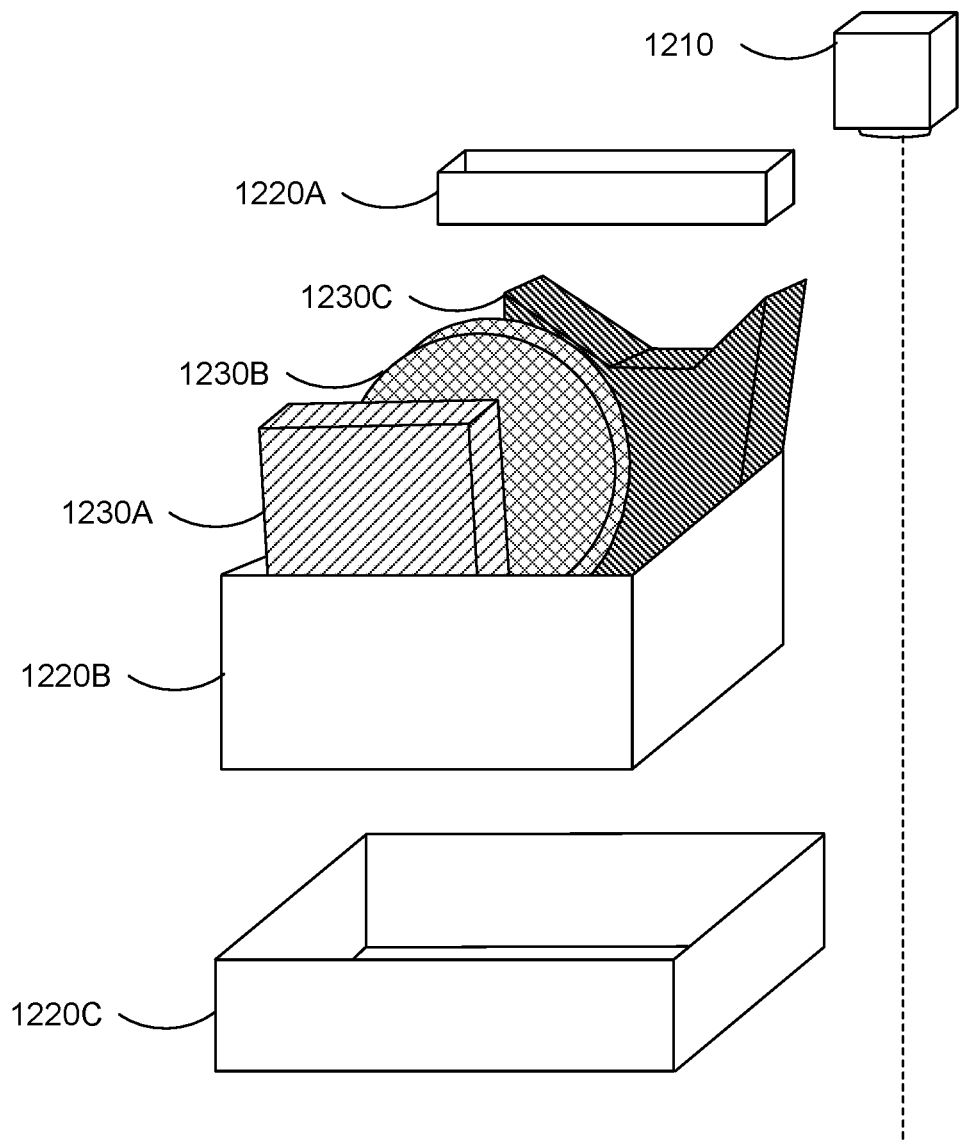
FIG. 12 shows various sizes of inventory bins and inventory items according to a particular embodiment.

FIG. 12 shows examples of inventory bins associated with an inventory holder and inventory items according to a particular embodiment. A sensor 1210 may be positioned near one or more inventory bins 1220A, 1220B, 1220C (collectively "inventory bins 1220"). The inventory bins 1220 may comprise different sizes, including different heights, widths, and depths.

The inventory bins may be identified using sensed data or stored information about the inventory holders and bins. For example, the sensor 1210 may sense or measure the dimensions of the inventory bin and the system may store these dimensions in a data store associated with the system. The dimensions may, for example, be stored as an attribute of the inventory holder (e.g. inventory holder 1 comprises a bin that is 4-foot by 1-foot, etc.).

The system may also access information about the inventory items 1230A, 1230B, 1230C (collectively "inventory items 1230") contained within the inventory bins. For example, the system may access item information associated with an inventory item stored in a first inventory bin. The inventory item information may identify a shape of the inventory item. The system may compare the shape of the item with the sensed data (e.g., from sensor 1210, etc.) and, based at least in part on the comparing, determine that the sensed item does not match the stored information about the item. The system may determine, for example, that the object sensed by the sensor is a human appendage.

In another example, the system may access item information associated with the item that identifies a color or size of the inventory items 1230. The system may compare the item information with the sensed data and determine that the object identified by the sensor is the inventory item or is likely a human appendage, based at least in part on the comparison.

The location of the inventory item 1230 may be determined based at least in part on the sizes of the inventory bins 1220 within the inventory holder. For example, the system may determine that only one inventory bin is large enough to contain a particular inventory item that was sensed by the system (e.g., inventory bin 1220B, etc.). When the inventory item is placed into the inventory holder, the system may determine that the inventory item was placed in the only inventory bin that would be able to store the inventory item in that particular inventory holder (e.g., inventory bin 1220B, etc.). In another example, the inventory holder may comprise multiple inventory bins that may store an item, but one inventory bin may be full (e.g., inventory bin 1220B, etc.) and the other inventory bin has space to store the inventory item (e.g., inventory bin 1220C, etc.). The system may determine that the inventory item was placed in the inventory bin with space to store the inventory item (e.g., inventory bin 1220C, etc.).

Figure 13:
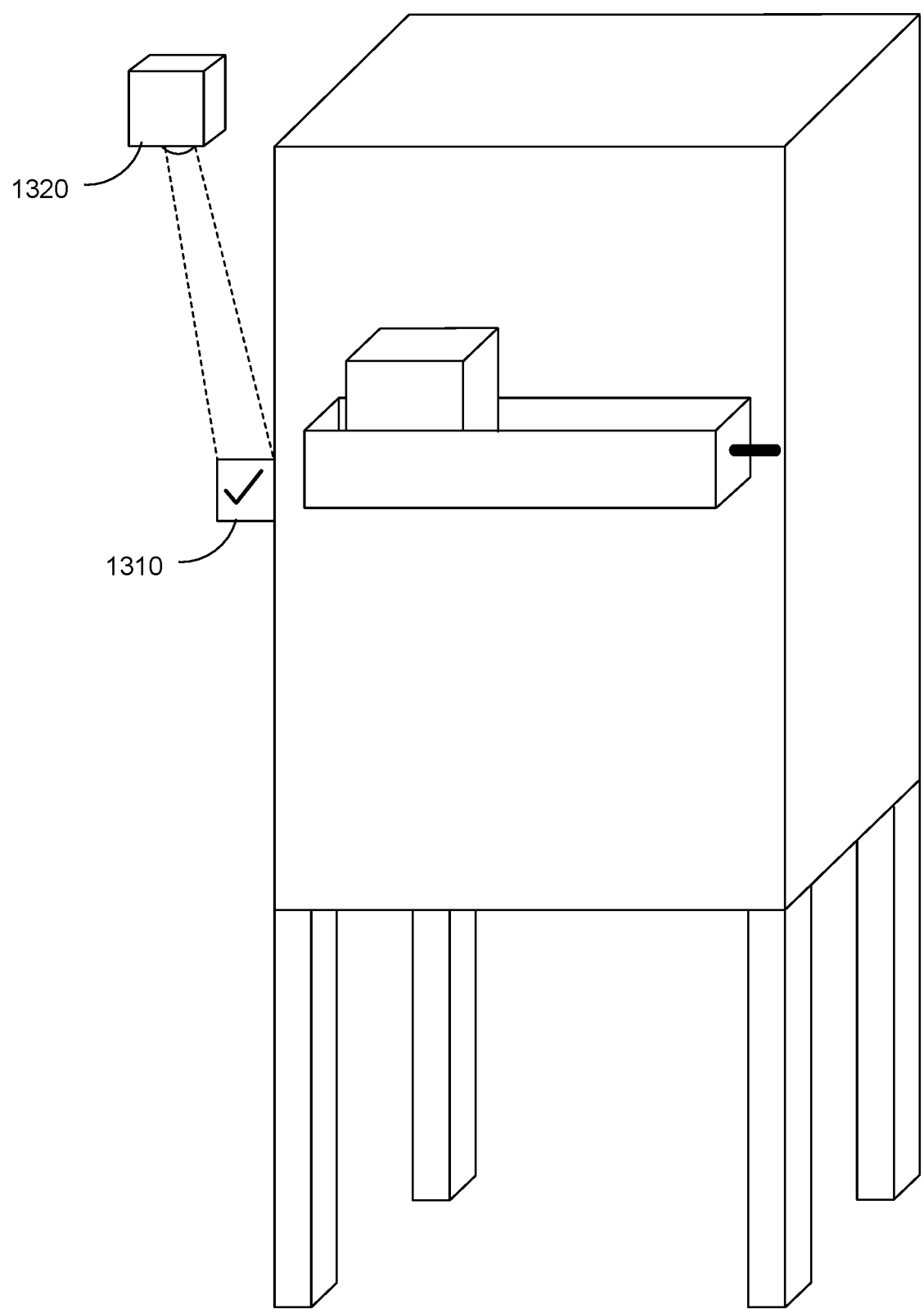
FIG. 13 shows feedback associated with the inventory holder according to a particular embodiment.

FIG. 13 shows feedback associated with the inventory holder according to a particular embodiment. The user interface 1310 may provide information in various formats, including through use of a graphical user interface (GUI), a flashing or blinking light onto a surface of the inventory holder, inventory bin, or inventory item, a colored light, or other methods described herein and known in the art. The feedback may be provided via a user interface 1310 associated with the inventory management system. The user interface may be configured to provide feedback associated with an overhanging item or confirm the item information (e.g., item 100A is placed in inventory bin 200B, etc.).

The feedback may be provided to instruct the user to perform an action. For example, the feedback may identify an empty bin that may store a particular inventory item. The feedback may direct the user to a particular area.

The feedback may be provided to confirm an action. For example, the feedback may identify that an object has obstructed a light curtain provided by a sensor 1320. The system may identify where the obstruction occurred (e.g., an object hanging over the outside of the inventory holder at location 100C) or instruct the user to remove the obstruction before proceeding.

In some examples, the system may shine a light where there is an obstruction or overhanging object (e.g., red light to overhang, white light to provide feedback to confirm where the item is placed, etc.). The light may correspond with other feedback as well, including to track the inventory item as the inventory item is moved from a first inventory bin to a second inventory bin. In some examples, the light may provide feedback to confirm that the inventory item was placed in a particular inventory bin by flashing the light on the inventory bin after the inventory item is released by the user into the inventory bin.

In some examples, the user may scan the inventory item by placing the inventory item in front of the sensor 1320 and/or pressing a button associated with the inventory holder to indicate the location where they have placed the inventory item.

Another type of feedback may direct a user to fix an overhanging item. For example, the system may shine a light on the overhanging object to identify that the object is overhanging. A blinking or red light may identify that the overhanging object should be moved. Other actions may be implemented without diverting from the scope of the disclosure, including shining an intense white light at the object instead of blinking, or turning off other lights to highlight an inventory item that is highlighted using standard lights, or the like.

Figure 14:
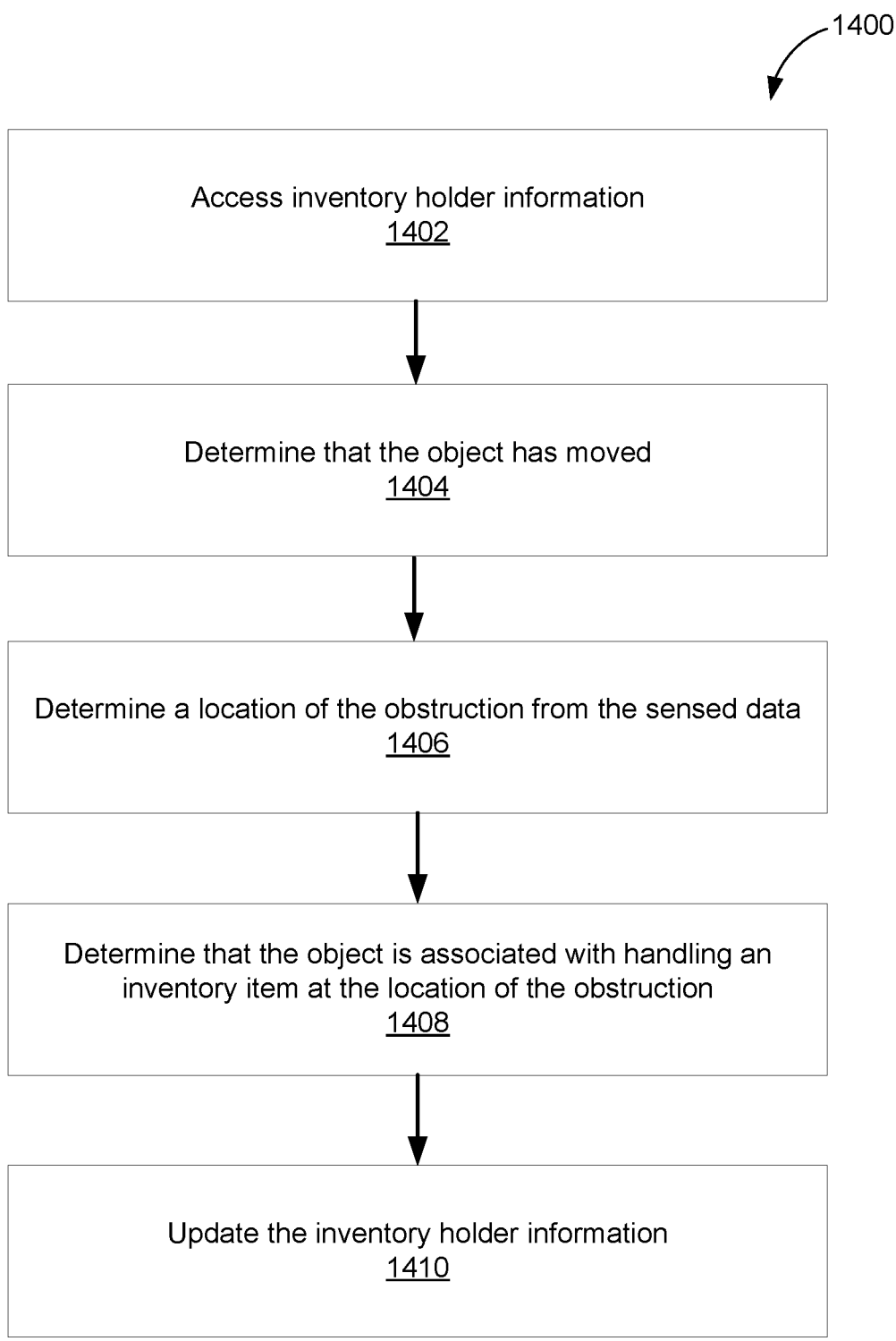
FIG. 14 shows an example flow utilized in particular embodiments of the inventory system.

FIG. 14 illustrates an example flow diagram utilized in particular embodiments of the inventory system. In some examples, the inventory management system may perform the process 1400 of FIG. 14. The process 1400 may begin at 1402 by accessing inventory holder information. For example, the inventory holder information may describe at least an attribute of the inventory holder, including one or more inventory bins that are stored in the inventory holder, one or more inventory items, and the like. At 1404, the process 1400 may include determining that an object has moved. For example, the determination may identify that an object has moved between the inventory holder and the sensor. This may be based at least in part on sensed data about an obstruction by the object of a portion of the inventory holder. At 1406, the process 1400 may include determining a location of the obstruction. For example, the location may be determined based at least in part on the sensed data. At 1408, the process 1400 may include determining that the object is associated with handling an inventory item at the location of the obstruction. Further in some examples, the process 1400 may end at 1410, where the process 1400 may include updating the inventory holder information. For example, the inventory holder information may be updated to describe the attribute of the inventory holder and a relative location of the inventory item in the inventory holder based on handling the inventory item.

Figure 15:
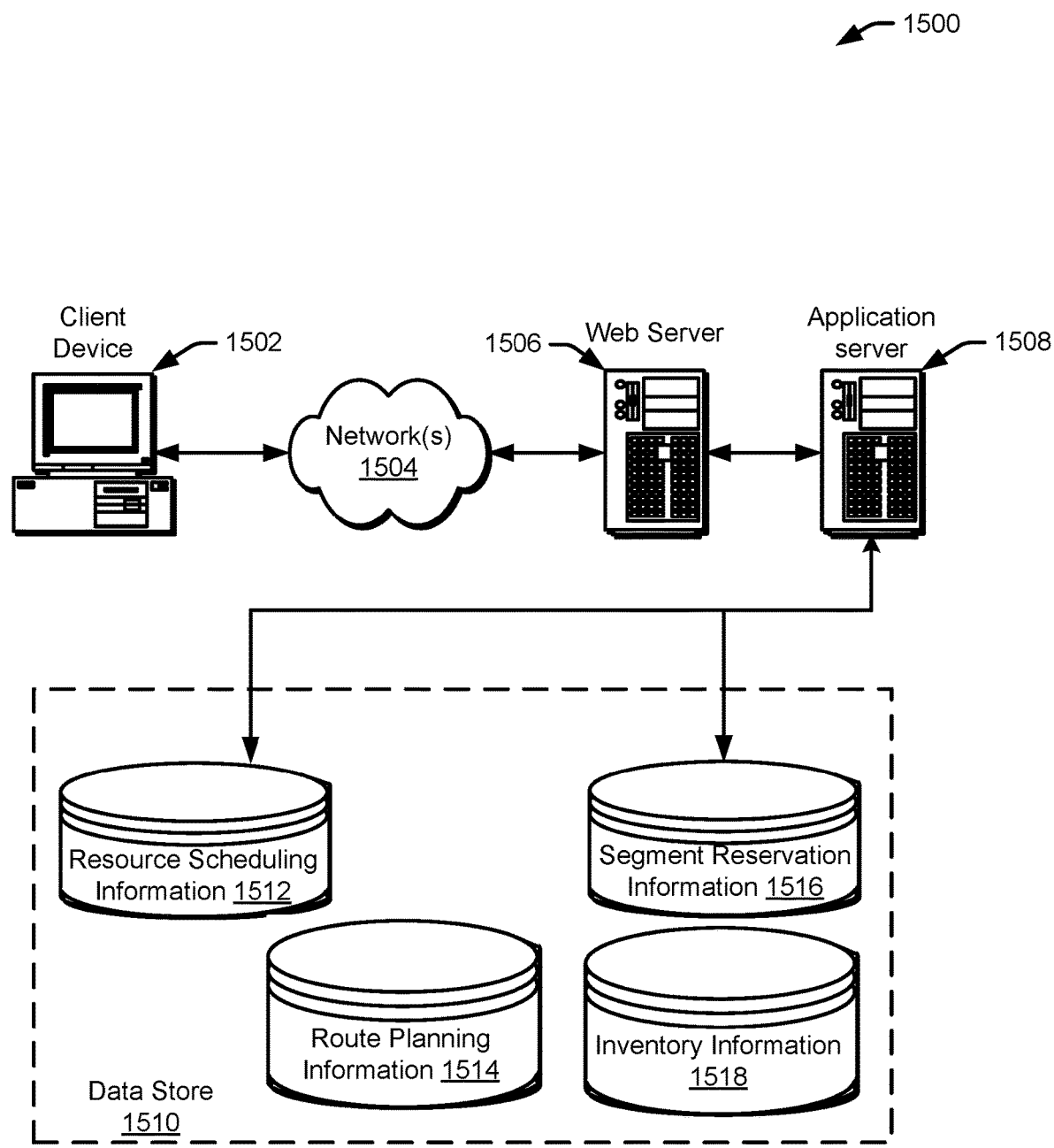
FIG. 15 illustrates an environment in which various features of the inventory system may be implemented, in accordance with at least one embodiment.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which may include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, may be handled by the Web server. It should be understood that the Web and application servers are not required and are merely example components, as structured code discussed herein may be executed on any appropriate device or host machine as discussed elsewhere herein.

The data store 1510 may include several separate data tables, databases or other data storage mechanisms and media for storing data relating to a particular aspect. For example, the data store illustrated includes mechanisms for storing information which may be used by modules described herein, such as resource scheduling information 1512, route planning information 1514, segment reservation information 1516, and/or inventory information 1518. It should be understood that there may be many other aspects that may need to be stored in the data store, such as for page image information and to access right information, which may be stored in any of the above listed mechanisms as appropriate or in additional mechanisms in the data store 1510. The data store 1510 is operable, through logic associated therewith, to receive instructions from the application server 1508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network may be, for example, a local area network, a wide-area network, a virtual private network, the Internet, an intranet, an extranet, a public switched telephone network, an infrared network, a wireless network, and/or any combination thereof.

In embodiments utilizing a Web server, the Web server may run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which may be used to store the desired information and which may be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   inventory holders configured to store inventory items;
   mobile drive devices configured to move the inventory holders;
   a station configured for performance of a task related to one or more inventory items associated with an inventory holder based at least in part on the inventory holder being positioned at the station;
   storage locations that are stationary and remote from the station and that facilitate storage of the inventory holders;
   a sensor located at a distance from the station and configured to sense objects; and
   one or more computer processors communicatively coupled with the station and the sensor and configured to:
      access, from a data store associated with the inventory management system, inventory holder information describing at least an attribute of the inventory holder;
      determine that an object has moved between the inventory holder and the sensor based at least in part on sensed data by the sensor about an obstruction by the object of a portion of the inventory holder;
      determine a location of the obstruction by the object based at least in part on the sensed data;
      identify a first inventory bin associated with the inventory holder based at least in part on the inventory holder information and the location of the obstruction;
      access item information associated with an inventory item stored in the first inventory bin, the item information identifying a color or size of the inventory item;
      determine that the object moved between the inventory holder and the sensor before an interaction with the inventory item at the station based at least in part on second sensed data, the second sensed data obtained from a different sensor of a different station and indicating, initially, the interaction with the inventory item and, subsequently, that the different sensor is clear of the object, the different station being one of a plurality of stations associated with the inventory management system;
      based at least in part on the inventory holder information, the location of the obstruction, a comparison of the item information and the sensed data by the sensor about the obstruction by the object, and the second sensed data, determine that the object is associated with handling the inventory item at the location of the obstruction or that the object is an overhanging inventory item; and
      update, at the data store associated with the inventory management system, the inventory holder information to include a relative location of the inventory item in the inventory holder based at least in part on determining that the object is associated with the handling of the inventory item or that the object is the overhanging inventory item.

2. The inventory management system of claim 1, wherein the one or more computer processors are further configured to:
   identify a second inventory bin associated with the inventory holder, wherein the second inventory bin is identified based at least in part on the inventory holder information, and wherein the second inventory bin is used for storing additional inventory items with the inventory holder.

3. The inventory management system of claim 2, wherein the one or more computer processors are further configured to:
   determine a first size of the first inventory bin based at least in part on the inventory holder information;
   determine a second size of the second inventory bin based at least in part on the inventory holder information;
   determine that the first size of the first inventory bin is too small to fit the inventory item based on a comparison of the first size of the first inventory bin and the size of the inventory item; and
   based at least in part on a determination that the second size is larger than the size of the item, determine that the handling of the inventory item comprises storing the inventory item in the second inventory bin.

4. The inventory management system of claim 1, wherein the sensor is physically separated from the station and the mobile drive devices.

5. A computer-implemented method, comprising:
   accessing, by an inventory management system, inventory holder information associated with an inventory holder, the inventory holder configured to store an inventory item, the inventory management system comprising the inventory holder and a sensor;
   determining, by the inventory management system, that an object has moved between the inventory holder and the sensor based at least in part on sensed data by the sensor about an obstruction by the object of a portion of the inventory holder;
   determining, by the inventory management system, a location of the obstruction by the object based at least in part on the sensed data;

identifying, by the inventory management system, an inventory bin associated with the inventory holder based at least in part on the inventory holder information and the location of the obstruction;

accessing, by the inventory management system, item information associated with the inventory item stored in the inventory bin, the item information identifying an attribute of the inventory item;

determining, by the inventory management system, that the object moved between the inventory holder and the sensor before an interaction with the inventory item at a particular station based at least in part on second sensed data, the second sensed data obtained from a different sensor of the particular station and indicating, initially, the interaction with the inventory item and, subsequently, that the different sensor is clear of the object, the particular station being one of a plurality of stations associated with the inventory management system;

determining, by the inventory management system and based at least in part on the inventory holder information, the location of the obstruction, a comparison of the item information and the sensed data by the sensor about the obstruction by the object, and the second sensed data that the object is associated with handling the inventory item at the location of the obstruction or that the object is an overhanging inventory item; and updating, by the inventory management system, a relative location of the inventory item in the inventory holder based at least in part on determining that the object is associated with the handling of the inventory item or that the object is the overhanging inventory item.

6. The computer-implemented method of claim 5, wherein the sensor is a LiDAR sensor.

7. The computer-implemented method of claim 5, further comprising:

instructing, by the inventory management system, a mobile drive device to move the inventory holder to a different location based at least in part on the determination that the inventory item is overhanging.

8. One or more computer-readable storage media collectively storing computer-executable instructions that, when executed by one or more computer systems, configure the one or more computer systems to collectively perform operations comprising:

accessing, from a data store associated with an inventory management system, inventory holder information, the inventory management system comprising a sensor and an inventory holder, the inventory holder information associated with the inventory holder, the inventory holder configured to store an inventory item;

determining that an object has moved between the inventory holder and the sensor based at least in part on sensed data by the sensor about an obstruction by the object of a portion of the inventory holder;

determining a location of the obstruction by the object based at least in part on the sensed data;

identifying an inventory bin associated with the inventory holder based at least in part on the inventory holder information and the location of the obstruction;

accessing item information associated with the inventory item stored in the inventory bin, the item information identifying a color or size of the inventory item;

determining that the object moved between the inventory holder and the sensor before an interaction with the inventory item at a particular station based at least in part on second sensed data, the second sensed data obtained from a different sensor of the particular station and indicating, initially, the interaction with the inventory item and, subsequently, that the different sensor is clear of the object, the particular station being of a plurality of stations associated with the inventory management system;

based at least in part on the inventory holder information, the location of the obstruction, a comparison of the item information and the sensed data by the sensor about the obstruction by the object, and the second sensed data, determining that the object is associated with handling the inventory item at the location of the obstruction or that the object is an overhanging inventory item; and updating, at the data store, a relative location of the inventory item in the inventory holder based at least in part on determining that the object is associated with the handling of the inventory item or that the object is the overhanging inventory item.

9. The computer-readable storage media of claim 8, wherein the operations further comprise: providing feedback via a user interface associated with the inventory management system, wherein the user interface is configured to provide feedback associated with the inventory item, and wherein the feedback identifies the overhanging inventory item.

10. The computer-readable storage media of claim 8, wherein the operations further comprise: shining a light on the object, the light being associated with the inventory management system.

11. The computer-readable storage media of claim 8, wherein the operations further comprise:

determining, based at least in part on the second sensed data, that the object has moved into the inventory holder; and based at least in part on the object moving into the inventory holder, determining that the inventory item is stowed in the inventory holder at a particular location associated with the second sensed data.

12. The computer-readable storage media of claim 11, wherein the operations further comprise:

determining, based at least in part on the second sensed data, that the object is a particular inventory item; and updating the relative location of the particular inventory item into the inventory holder.

13. The computer-readable storage media of claim 8, wherein the operations further comprise:

determining a shape of the object based at least in part on the sensed data; and storing the shape with the data store associated with the inventory management system.

\* \* \* \* \*